United States Patent Office 3,625,726
Patented Dec. 7, 1971

3,625,726
CLUSTERED ACICULAR PIGMENTS
Hugh C. Gulledge, Newark, Del., assignor to E. I. du Pont de Nemours and Company, Wilmington, Del.
No Drawing. Filed Feb. 27, 1970, Ser. No. 15,220
Int. Cl. C09c 1/36
U.S. Cl. 106—299                    5 Claims

ABSTRACT OF THE DISCLOSURE

Previously-formed fibrous materials which are suspended in a liquid are subjected to mechanical shear under controlled conditions to produce clustered acicular pigments characterized by, for example, an average diameter of from about 5 to 500 microns and an average density of from about 7 to 40 percent of the theoretical density wherein the individual acicular particles have an average diameter of from about 0.1 to 5 microns and a length-to-diameter ratio of from about 10 to 1000.

This invention pertains to clustered acicular pigments and a method of producing them.

Acicular pigments are well known in the art. U.S. Pat. 3,328,117 describes a process for producing fibrous alkali metal titanates of the formula $M_2O(TiO_2)_n$ wherein $n$ is 6–7 and M is an alkali metal having an atomic number of 11 or greater. The fibrous product described in that patent ranges in size from 0.1 micron to 3.0 micron average diameter and from about 10 to 1000 times the average diameter in length. U.S. Pat. 3,030,183 claims feltable titanium dioxide fibers having a cross section less than 25 microns and an axial ratio of at least 10:1. For purposes of this invention, the term "acicular" shall be considered synonymous with the term "fibrous."

The refractive indexes and the shape and size of these acicular pigments particularly adapt them to applications where hiding power is of primary interest, e.g., in paints and linoleum blocks. The acicular pigments, when in larger size ranges, have been used for insulating materials by compressing the fibers into blocks.

It is desirable to utilize acicular pigments having the before-mentioned properties in a pigment composition that also provides flatting in, for example, pains. Agglomeration of pigmentary particles is known in the art. U.S. Pat. 2,721,287 teaches a method of producing microspheres from pigmentary grade titanium dioxide thereby rendering the pigment free-flowing and non-dusting. However, an alkali metal silicate is required to be used as a binder.

STATEMENT OF THE INVENTION

The clustered acicular pigments of this invention are produced by subjecting to mechanical shear under controlled conditions, previously-formed fibrous materials which are suspended in a liquid. The size of the clusters is substantially uniform and varies as a function of the conditions of the mechanical shear. For purposes of this invention, the term "clusters" is defined as discrete fibrous agglomerates, the fibers of which are usually randomly oriented.

A preferred previously-formed fibrous material is one in which the individual fibers are from about 0.1 to 0.3 micron in diameter and have a length to diameter ratio of from about 10 to 100. It is desirable that the clusters resulting from the method of this invention have diameters from about 5 to 300 microns and densities in the range of from about 7 to 40 percent of the maximum theoretical density. The clusters of acicular pigment in such ranges exhibit superior resistance to breakage. The specific physical and chemical properties of the fibrous materials of which the clusters are formed, make the clusters particularly valuable in many applications where a high degree of opacity and flatting is desired. It has been found that the novel clustered acicular pigments have small internal pores which enable the pigments to retain agents other than, for example, the paint vehicle that surrounds the cluster. It is believed that this phenomenon renders desirable optical effects to the pigments.

A preferred acicular alkali metal titanate to be used in this invention is represented by the following formula, $M_2O \cdot H_2O \cdot TiO_2$ wherein M is an alkali metal selected from the group consisting of sodium, potassium, rubidium and cesium and wherein the molecular ratio of $TiO_2$ to $M_2O$ plus $H_2O$ is from 2 to 6, and the molecular ratio of $TiO_2$ to $M_2O$ is from 10 to 98.

Among the devices which have been found useful in applying the mechanical shear required by this invention to produce the clusters of acicular pigment are roll mills having adjustable nip and roll speed such as are commonly used in the production of paints or the milling of rubber; dough mixers commonly known as "sigma blade mixers"; and rotating flat parallel surfaces. It has also been found that a dilute suspension of fibrous particles subjected to controlled stirring formed the clustered products of this invention. By varying the conditions of mechanical shear and fluidity of the filter cake, the sizes, densities and yield of the clustered acicular pigments can be controlled. The conditions required for specific fibrous materials in specific liquid mediums would be obvious to one skilled in the art after understanding and utilizing the information described herein.

The following examples are illustrative of the invention and are not in limitation thereof. All parts and percentages are by weight unless otherwise indicated.

EXAMPLE 1

Fibrous potassium titanate having an average particle diameter of from about 0.1 microns to about 5 microns and a length to diameter ratio of from about 10:1 to 100:1 is washed to give a filter cake containing approximately 14.35 percent solids. The filter cake, weighing 2205 grams (316.4 grams fibrous potassium titanate), is adjusted, using sulfuric acid, to a pH level of 6.2 pH, placed in a sigma-blade mixer, and subjected to mixing for 1½ hours. During this time, microscopic examination of the slurry was made after 30 minutes, after 60 minutes, and at the conclusion of 1½ hours mixing time. The following Table I gives results which were observed by microscopic examination of the slurry.

TABLE 1

Average Diameter Range (Visual Estimate)

| | | |
|---|---|---|
| After 30 mins | 15–90 microns | Estimated 40% in clus_ered form (by weight.) |
| After 60 mins | 15–90 microns | Tighter balls, 50–80% in clustered form. |
| After 90 mins | 20–50 microns | Similar to the results obtained at 60 mins. |

It was found that when the filter cake, with adjusted pH, was subjected to mixing in the sigma-blade mixer, the slurry became noticeably more fluid after about 15 minutes of mixing. At the conclusion of the 1½ hours of mixing time, the slurry was easily poured from the container.

EXAMPLE 2

One-hundred liters of the slurry in Example 1, after one hour of mixing, is diluted with the addition of 20 liters of water, mixed with a large spatula, and successively wet-screened on vibrating screens of 200 mesh, 325 mesh, 400 mesh and 450 mesh. The following size fractions were obtained:

TABLE II

Size Fractions—Clustered Pigment Obtained from Mixing Fibrous Potassium Titanate Cake

| U.S. Standard Sieve | Dry (grams) wt. | Percent solids, wet cake | Percent yield on original [1] |
|---|---|---|---|
| +200 | 7.49 | 26.6 | 5.9 |
| −200+325 | 72.5 | 26.0 | 58 |
| −325+400 | 40.9 | 24.0 | 32.5 |
| −400+30μ | 5.0 | 29.0 | 3.6 |
| Total | [2] 125.9 | | |

[1] Percent based on pigment weight recovered from mixer.
[2] Total equals 40% overall yield on filter cake originally fed to mixer.

One possible reason for the low yield of final product versus the yield estimated by microscopic examinations made periodically during the mechanical shear mixing in Example 1, is that the vibrating screen operation effected redispersion of the fibers forming the clusters.

Using a mercury porosimeter, clusters obtained in each of the above size fractions were tested for density and pore size range. The following results were obtained.

TABLE III

Density and Pore Sizes of Potassium Titanate Clustered Pigments

| U.S. Standard Sieve | Percent of pigmentary potassium titanate [1] | Pore size range (μ) |
|---|---|---|
| −200 + 325 mesh fraction | 14.8 | 0.65–0.27 |
| −325 + 400 fraction | 12.9 | 0.64–0.29 |
| −400 + 30μ fraction | 12.3 | 0.68–0.29 |

[1] Theoretical density.

EXAMPLE 3

Fibrous potassium titanate filter cake weighing 2572 grams and having 14.35 percent solids is adjusted by means of sulfuric acid to a pH of 6.2 and mixed in a sigma-blade mixer for 1½ hours. After about 15 minutes of mixing the thick slurry became less viscous and at the conclusion of 1½ hours of agitation it is easily poured from the container. The slurry is then diluted with 28 liters of water, spatula mixed and allowed to stand for four hours. The supernatant liquid is decanted, and the pigment again repulped with the addition of 20 liters of water. The slurry is then allowed to stand for 48 hours, whereupon it is again decanted, filtered and dried at 120° C. overnight. The pigment which was recovered was 75 percent by weight of the potassium titanate fed to the mixer. By microscopic examination, it was found that only about 5 to 10 percent of the fibers was not agglomerated into clusters. The clusters which had formed were from 25 to 45 microns in diameter with a small portion of the clusters, about 30 percent by visual estimate, outside this range but within the range of 15 to 90 microns diameter. The density of the filter cake after drying at 110° C. was 16.5 pounds per cubit foot. This can be compared with an unclustered fibrous potassium titanate product showing a density of 25 to 30 pounds per cubic foot before being subjected to the process of this invention. The product which resulted from the process of this example is formed into a low-density high-strength insulating block by filtering a slurry of clustered fibrous potassium titanate.

EXAMPLE 4

A fibrous potassium titanate pigment is used to form 2500 grams of filter cake at 15.2 percent solids (380 grams dry weight fibrous potassium titanate). The filter cake is adjusted to a pH of 5.2 using sulfuric acid. The acidified filter cake is placed in a sigma-blade mixer and is mixed for one hour. At the conclusion of this time, microscopic examination of the slurry showed that about 80 percent by weight of the fibrous potassium titanate had formed into clusters. The slurry is then diluted by the addition of 26 liters of water and fractionated by wet screening as described in Example 3. The screen analysis was as follows:

TABLE IV

Size Fractions—Clusters of Fibrous Potassium Titanate

| U.S. Standard Sieve | Dry weight (grams) | Percent Yield (on 232 g.) |
|---|---|---|
| +200 mesh | 42.0 | 18.1 |
| −200 + 325 mesh | 60.4 | 26.0 |
| −325 + 400 | 47.0 | 20.2 |
| −400 | 82.7 | 35.6 |
| Total | 232.1 | 99.9 |

Overall yield of clusters: 61.1% by weight.

The −200 +325 mesh fraction and the −400 mesh fraction as given in Table IV are dried, micropulverized and then examined by microscope. There was no visible damage to the clusters by the micropulverizing operation. The micropulverized products are used to make two standard flat interior emulsion-type paints, the clustered product being substituted for all of the conventional extender and for 25 percent of the titanium dioxide ordinarily used in the formulation. The following Table V shows comparative formulations and Table VI shows comparative paint results.

TABLE V

Emulsion paints: Formulations using (1) Standard Titanium Dioxide Pigment plus Extenders and Formulations (2) and (3) Using Clusters of this Invention.
[Pigments and Extenders: lbs./gal.—50 PVC Formulations]

| | Formulation 1 | Formulations 2 and 3* |
|---|---|---|
| TiO₂ | 3.0 | 2.25 |
| Clustered pigment of these examples | | 0.5155 |
| Celite | 0.45 | |
| Clay | 0.53 | |
| CaCO₃ | 0.40 | |

* Formulation 2: −200 + 325 mesh fraction of clusters; Formulation 3: −400 mesh fraction of clusters.

EXAMPLE 5

Using a portion of the pigment prepared according to the process of Example 3, two separate size fractions of pigment are used in the preparation of polyvinyl acetate emulsion paint which is tinted with "Monostral" Blue pigment (a phthalocyanine blue pigment of the E. I. du Pont de Nemours & Co.). As a control, a portion of the same alkali metal titanate in the unclustered form is used to prepare a third paint sample. In each of these cases, no other pigment is used in the paint formulation. The results of testing of these three paints are summarized in Table VI.

TABLE VI

PVAC Emulsion Paint Containing Clustered Pigment, lbs./gal.

| | Unclustered fibrous potassium titanate | Clustered pigment of this invention (U.S. Stand. Sieve) | | PVC | Vol. percent solids | ASTM scrub cycles | 85° gloss | |
|---|---|---|---|---|---|---|---|---|
| | | +325, −200 | −400 | | | | Orig. | Burnish |
| 1 | 1.0 | | | 21.5 | 17.1 | 120 | 5.5 | 11.0 |
| 2 | | 1.0 | | 21.5 | 17.1 | 210 | 0.5 | 4.0 |
| 3 | | | 1.0 | 21.5 | 17.1 | 255 | 0.5 | 4.0 |

EXAMPLE 6

For the operation of this example, fibrous potassium titanate filter cake weighing 500 grams at 15.2% solids and pH 5.2 is fed to a 3-roll paint mill with roll nip approximately 1/64 inch clearance at multiple pass-through for a total working time of ten minutes. The slurry, which becomes noticeably more fluid during the working time, is removed from the mill and subjected to microscopic observation. By visual estimate, about 50 percent of the fibers are observed to have formed tight clusters. The slurry is diluted with 20 liters of distilled water, stirred and let stand for two hours. The supernatant liquid is then decanted, and the pigment repulped with 20 liters of water. This process is repeated for a total of three dilutions and decantations. The slurry is then filtered and 62.5 grams of wet cake are obtained. The cake is dried for 16 hours at 125° C. to yield 17.5 grams of dry product, thus representing 23 percent yield on the total alkali metal titanate fed to the roller mill. The clusters ranged in sizes from about 12 to about 70 microns (diameter), the average diameter being about 25 microns, the density 0.5087 g./cc. (14.5% of theoretical density), and the pore size ranged from 0.65 to $0.25\mu$.

EXAMPLE 7

For this example, 5 gallons of a slurry containing three percent potassium titanate solids and of pH 11.95 is adjusted to pH 5 by the addition of 520 cc. of 10 percent (by weight) sulfuric acid. The adjusted slurry is stirred in a 14 inch diameter can with a paddle stirrer 11 inches by 2 inches. The speed of the stirrer is adjusted to 100 r.p.m., which gave a peripheral speed of 288 ft./min. The slurry of alkali metal titanate fibers is stirred for a total of 12 hours, with periodic microscopic observations being made. After three hours stirring time, there is a high population of loose clusters of about 50 to about 150 microns in cross section. After six hours stirring, the clusters appeared to be more dense, and of about 50 to 200 microns average cross section. After 12 hours of stirring, a 50 percent conversion of fibers to clusters was estimated by microscopic observation. The product is successively wet screened on vibrating screens of mesh size 200, 325, and 400. The following size fractions were obtained.

| U.S. standard sieve screen size: | Dry wt. (grams) |
|---|---|
| +200 | 10.5 |
| +325, −200 | 3.7 |
| +400, −325 | 3.1 |
| Total (grams equal 3.1% yield) | 17.3 |

One possible reason for the low yield of final product versus the yield estimated by microscopic examinations made periodically during the mechanical shear mixing, is that the vibrating screen operation effected redispersion of the fibers forming the clusters.

EXAMPLE 8

For the preparation of the clustered pigment of this example, acicular rutile is used. This fibrous material is comprised of particles of 0.1 to 0.3 micron cross sectional diameter, and length-to-diameter ratio of from 10:1 to 120:1. To prepare the clustered pigment of this invention, the acicular rutile is mixed in water to give a slurry of 15% by weight solids. Several drops of this slurry are placed on a microscope slide, this is covered by a second microscope slide and the two slides are rubbed together for a period of one minute. The slurry which has thus been subjected to mechanical shear is examined under the microscope. It is observed that about 40–50% of the total weight of the acicular rutile forms into clusters of from 10 to about 30 microns in cross section.

It will be seen from the disclosure and from the examples given here, that the application of mechanical shear will effect clustering of selectively-sized fibrous pigments so that the properties of these fibrous pigments are improved. Although we do not intend that our invention should be limited by any theoretical explanation, it is probable that the improvement in hiding power and flatting exhibited by the clustered pigments of this invention when compared with the same quantity of the same pigment in the unclustered condition, is due to the small air pores in the clusters which are not completely penetrated by paint vehicles. This gives high pigment-air interface hiding without sacrificing film properties. Some of the large size clusters partially protrude out of the paint film to give high scattering of incident light to prevent the specular reflectance normally called gloss.

What is claimed is:

1. A clustered pigment comprising acicular particles, said clustered pigment particles having an average diameter of from about 5 to 500 microns and an average density of from about 7 to 40 percent of the theoretical density, and the individual acicular pigment particles before clustering having an average diameter of from about 0.1 to 5 microns, a length-to-diameter ratio of from about 10 to 1000, and being selected from the group consisting of titanium dioxide particles and alkali metal titanate particles represented by the formula $M_2O \cdot H_2O \cdot TiO_2$, in which M is an alkali metal selected from the group consisting of sodium, potassium, rubidium, and cesium, and in which the molecular ratio of $TiO_2$ to $M_2O$ plus $H_2O$ is from 2 to 6 and the ratio of $TiO_2$ to $M_2O$ is from 10 to 98.

2. A clustered pigment of claim 1 wherein the acicular particles are said alkali metal titanate particles.

3. A clustered acicular alkali metal titanate pigment of claim 2 wherein the alkali metal titanate fibers have a diameter of from about 0.1 to 5 microns and a length-to-diameter ratio of from about 10 to 100.

4. A clustered pigment of claim 1 wherein the acicular particles are titanium dioxide.

5. A clustered pigment of claim 4 wherein the titanium dioxide fibers have a diameter of from 0.1 to about 3 microns and a length-to-diameter ratio of about 10 to 1000.

References Cited

UNITED STATES PATENTS 3,380,847   4/1968   Lewis et al. _____ 106—299

JAMES E. POER, Primary Examiner

U.S. Cl. X.R.

106—300